(12) United States Patent
Lu

(10) Patent No.: US 7,830,388 B1
(45) Date of Patent: Nov. 9, 2010

(54) METHODS AND APPARATUS OF SHARING GRAPHICS DATA OF MULTIPLE INSTANCES OF INTERACTIVE APPLICATION

(75) Inventor: Yang Lu, Streamwood, IL (US)

(73) Assignee: ViTie Inc.

( * ) Notice: Subject to any disclaimer, the term of this patent is extended or adjusted under 35 U.S.C. 154(b) by 889 days.

(21) Appl. No.: 11/670,968

(22) Filed: Feb. 3, 2007

Related U.S. Application Data

(60) Provisional application No. 60/765,930, filed on Feb. 7, 2006, provisional application No. 60/780,020, filed on Mar. 7, 2006.

(51) Int. Cl.
- G06F 15/00 (2006.01)
- G06T 1/00 (2006.01)
- G06F 17/00 (2006.01)
- G06F 15/16 (2006.01)
- G06T 15/00 (2006.01)

(52) U.S. Cl. .................. 345/501; 345/418; 345/502
(58) Field of Classification Search .................. 345/501, 345/502, 418, 505
See application file for complete search history.

(56) References Cited

U.S. PATENT DOCUMENTS

| | | | | |
|---|---|---|---|---|
| 4,665,555 A | * | 5/1987 | Alker et al. ............... | 382/305 |
| 5,065,438 A | * | 11/1991 | Hirose et al. ............... | 382/202 |
| 5,361,387 A | * | 11/1994 | Millar et al. ............... | 345/543 |
| 5,421,028 A | * | 5/1995 | Swanson ..................... | 712/42 |
| 5,477,242 A | * | 12/1995 | Thompson et al. .......... | 345/698 |
| 5,526,474 A | * | 6/1996 | Fukushima ................. | 345/443 |
| 5,710,881 A | * | 1/1998 | Gupta et al. ................ | 709/200 |
| 5,736,987 A | * | 4/1998 | Drucker et al. ............. | 345/420 |
| 5,751,979 A | * | 5/1998 | McCrory .................... | 715/803 |
| 5,777,608 A | * | 7/1998 | Lipovski et al. ............. | 345/519 |
| 5,812,781 A | * | 9/1998 | Fahlman et al. ............. | 709/226 |
| 5,828,382 A | * | 10/1998 | Wilde .......................... | 345/552 |
| 5,852,443 A | * | 12/1998 | Kenworthy .................. | 345/441 |
| 5,884,046 A | * | 3/1999 | Antonov ...................... | 709/238 |
| 5,898,687 A | * | 4/1999 | Harriman et al. ............ | 370/390 |
| 5,914,726 A | * | 6/1999 | Schultz ....................... | 345/501 |
| 5,963,201 A | * | 10/1999 | McGreggor et al. ......... | 715/722 |
| 5,987,027 A | * | 11/1999 | Park et al. ................... | 370/360 |
| 6,148,324 A | * | 11/2000 | Ransom et al. ............. | 718/105 |
| 6,246,415 B1 | * | 6/2001 | Grossman et al. ........... | 345/422 |
| 6,281,986 B1 | * | 8/2001 | Form .......................... | 358/403 |
| 6,317,795 B1 | * | 11/2001 | Malkin et al. ............... | 709/246 |
| 6,323,860 B1 | * | 11/2001 | Zhu et al. ................... | 345/427 |
| 6,459,429 B1 | * | 10/2002 | Deering ...................... | 345/423 |
| 6,496,193 B1 | * | 12/2002 | Surti et al. .................. | 345/552 |
| 6,891,543 B2 | * | 5/2005 | Wyatt ......................... | 345/541 |
| 6,989,836 B2 | * | 1/2006 | Ramsey ...................... | 345/522 |
| 7,245,302 B1 | * | 7/2007 | Donham et al. ............. | 345/519 |

(Continued)

Primary Examiner—Kee M Tung
Assistant Examiner—Robert Craddock

(57) ABSTRACT

The present invention presents systems and methods for running interactive applications such as video games remotely over broadband network by an interactive application host system. In accordance with the present invention, interactive applications such as video games can be hosted and executed remotely by one or multiple interactive application hosts in native mode or using emulation or other similar binary execution technique. An interactive application host system can use dedicated graphics rendering apparatus inter-connected with the interactive application host(s) for rendering or compressing frames of multiple interactive applications. A graphics rendering apparatus can cache the graphics data received from the interactive application host(s) and share graphics data among multiple instances of interactive application from the same interactive application host or from different interactive application hosts.

20 Claims, 5 Drawing Sheets

U.S. PATENT DOCUMENTS

| | | | |
|---|---|---|---|
| 7,439,979 B1 * | 10/2008 | Allen et al. | 345/506 |
| 2001/0020248 A1 * | 9/2001 | Banga et al. | 709/219 |
| 2003/0191859 A1 * | 10/2003 | Ramsey | 709/247 |
| 2003/0210248 A1 * | 11/2003 | Wyatt | 345/541 |
| 2004/0119709 A1 * | 6/2004 | Strom et al. | 345/421 |
| 2005/0088445 A1 * | 4/2005 | Gonzalez et al. | 345/502 |
| 2006/0080702 A1 * | 4/2006 | Diez et al. | 725/30 |
| 2006/0146058 A1 * | 7/2006 | Zhang et al. | 345/531 |
| 2006/0164406 A1 * | 7/2006 | Emerson et al. | 345/204 |

* cited by examiner

METHODS AND APPARATUS OF SHARING GRAPHICS DATA OF MULTIPLE INSTANCES OF INTERACTIVE APPLICATION

This application claims the benefit of U.S. Provisional Application No. 60/765,930, filed on Feb. 7, 2006, and U.S. Provisional Application No. 60/780,020, filed on Mar. 7, 2006.

BACKGROUND OF THE INVENTION

1. Field of the Invention

This invention relates to video game or interactive application hosting service where frames or video of the hosted applications are rendered remotely and delivered to the clients (e.g., set-top box, mobile device, etc.) over broadband network, wherein the interactive application hosting service applies resource sharing in graphics rendering apparatuses.

2. Description of the Prior Art

The prior art of running interactive entertainment applications on widely available consumer media play devices are, specialized game consoles such as Playstation 3 or XBOX that become increasingly sophisticated and expensive to design and manufacture; interactive television that mainly designed for on-demand viewing of shows, movies, videos, etc; on-demand-game-download that downloads games or emulators on demand over broadband network to a device that will execute the downloaded game or emulator locally.

BRIEF DESCRIPTION OF THE DRAWINGS

The invention may be better understood, and further advantages and uses thereof more readily apparent, when considered in view of the following detailed description of exemplary embodiments and examples, taken with the accompanying diagrams, in which.

Figure 1:
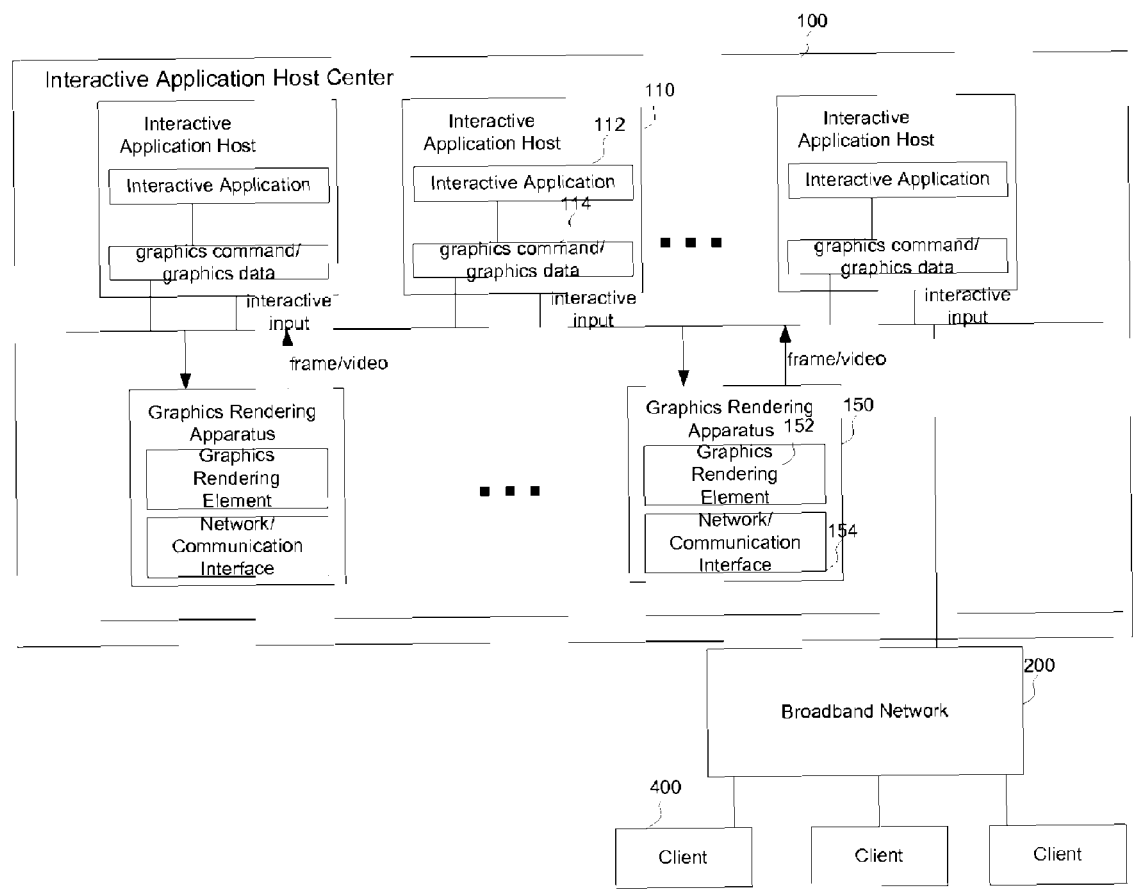
FIG. 1 is a block diagram showing, in one exemplary embodiment, components of an interactive application host center.

While the patent invention shall now be described with reference to the embodiments shown in the drawings, it should be understood that the intention is not to limit the invention only to the particular embodiments shown but rather to cover alterations, modifications and equivalent arrangements possible within the scope of appended claims. Throughout this discussion that follows, it should be understood that the terms are used in the functional sense and not exclusively with reference to specific embodiment, implementation, programming interface.

DETAILED DESCRIPTION OF THE PREFERRED EMBODIMENTS

Discussion in this section is intended to provide a brief description of some exemplary embodiments of the present invention.

FIG. 1 is a block diagram showing, components of an interactive application host center and example organization of video game host center where execution of video game simulation and graphics rendering are separated. In one embodiment, an interactive application host center (100) comprises a collection of interactive application hosts (110) that execute interactive applications (112) (e.g., video game, graphical interactive application, etc.) for one or a collection of clients (400). An interactive application host center (100) can compromise one or multiple graphics rendering apparatuses (150) that can render graphics frames for the applications executed by the interactive application hosts (110). An interactive application host center (100) can compress the rendered frames into media stream, and transmit the media over broadband network (e.g., Internet, IP-TV network, 3G/4G network, etc.) (200).

On the client side, there are clients (400) (e.g., set-top box, computer, mobile device such as PDA or cellphone, etc.). A client (400) supports rendering of the media streams transmitted to it from an interactive application host center (100) over the network (200). It can decompress the received media stream, display the interactive application frames on an attached display device (e.g., television, monitor, LCD panel, etc.).

For interactive game play or control, a client system can compromise one or multiple input devices such as game pad or video game controller or other similar game input device. Optionally, a television controller or the client (400) itself (e.g., cellphone, PDA) can be used as an input device. An input device can connect to the client (400) via wired or wireless connection.

In one embodiment, an interactive application host can comprise multiple high performance computer processors or comprise multiple computer processors featuring several processing elements or processor cores in a single chip or in a single IC (integrated circuit) package, so called multi-core or many-core processors.

The interactive applications (112) hosted by an interactive application host (110) can be single-user or multi-user applications. For a single-user application, the application receives interactive inputs from a single client. For a multi-user application, the application receives inputs from multiple or a collection of clients (400). Furthermore, in an embodiment, to support large number of clients, multiple interactive application hosts (110) can participate in running one interactive application. According to the present invention, multiple game applications (112) can also be executed concurrently on a video game host in native mode, in which each interactive application instance is executed as a task or a computer process.

In accordance with the present invention, in one embodiment, an interactive host can use emulation (e.g., platform emulation, virtual machine, operating system emulation, etc.) to run interactive applications (112) developed for hardware or operating system different from the hardware or system of the interactive application host (110). In one exemplary embodiment, an interactive application host (110) can run multiple emulation or simulation tasks with each task emulating a console or a computer platform or an operating system. For example, in one embodiment, an interactive application host (110) can run multiple emulators of some commercial game console or arcade.

Furthermore, in each emulated platform, there can be one or multiple interactive applications (112) executed. An interactive application host (110) can also run simulation or emulation of another operating system (target operating system) in order to run interactive applications (112) originally developed for the target operating system. Note that this can be done by providing compatible software implementation of the target operating system's kernel services. For example, using OS emulation or simulation, Windows interactive applications can be executed on Linux system. When emulation is used, the host operating system running on the interactive application host can create emulation tasks that emulate the target platform or the target operating system along with the interactive application (110) or applications running over the target platform or the target operating system.

Still referring to FIG. 1, there are a collection of rendering apparatuses (150) used for graphics rendering. An interactive application host (110) can capture the graphics command (e.g., graphics processing API(application programming interface) call, graphics rendering command, etc.) and/or graphics data (114) of an interactive application (112). The interactive application host (110) can send the graphics command or graphics data (114) to the graphics rendering apparatuses (150) that perform graphics processing. A graphics rendering apparatus (150) can comprise one or multiple networking/communication interfaces (154) for receiving graphics command or graphics data (114), and one or multiple graphics processing elements (152) for conducting graphics processing and frame rendering.

In additional embodiment, because the rendered frames are not displayed locally by the video game host, for each game application, its graphics can be rendered on some "virtual frame buffer" (e.g., emulated display device, virtual frame buffer, non-display buffer, or "memory surface", etc.).

Figure 2:
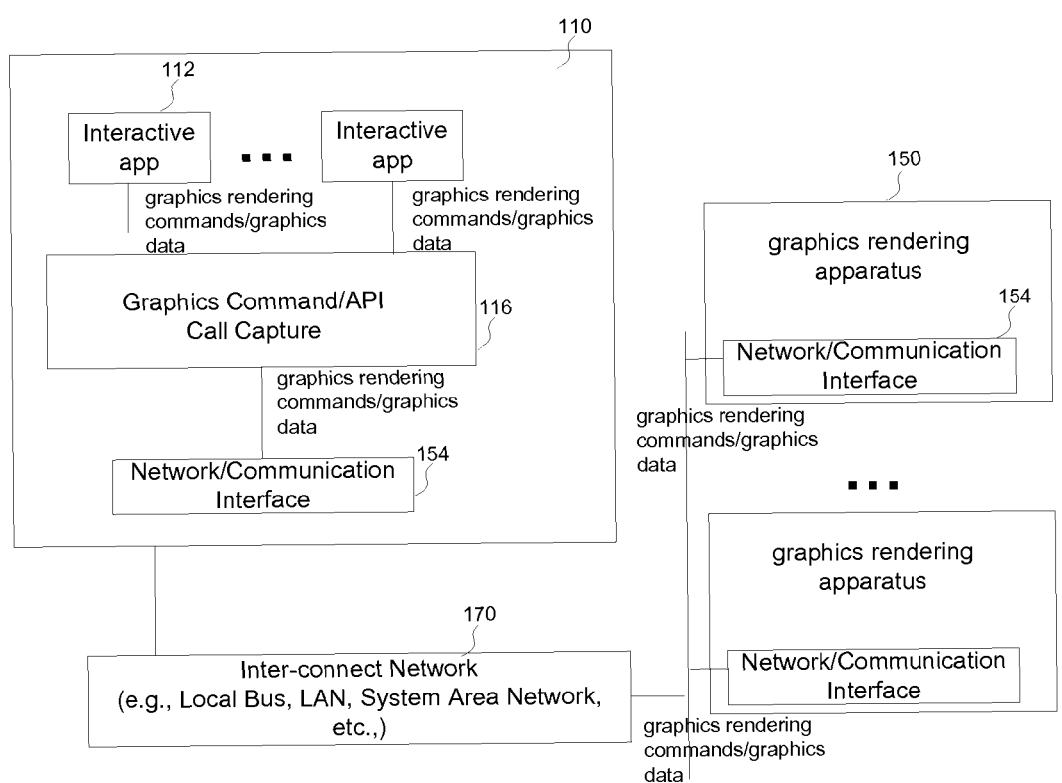
FIG. 2 is a block diagrams showing, in an exemplary embodiment, components and steps of running interactive applications on an interactive application host and having the display frames rendered by graphics rendering apparatus.

FIG. 2 is a block diagrams showing, in an exemplary embodiment of the present invention, components and steps of running interactive applications (112) or video games on an interactive application host (110) and having the display frames rendered by dedicated graphics rendering apparatus (150). In one embodiment, an interactive application host (110) can use API (application programming interface) redirection or API wrapper or API emulation to capture graphics rendering commands and graphics data. For example, two most popular graphics APIs used for developing video games are OpenGL and Direct3D. Using API redirection or API wrapper, an interactive host (110) can capture all the graphics API calls (116) made by an interactive application (112) and graphics data sent by the interactive application (112) for graphics rendering.

In an alternative embodiment, fake or dummy OpenGL or Direct3D device driver can be used to capture all the graphics API calls or graphics data (116). Those dummy graphics drivers export the standard OpenGL or Direct3D or graphics device calls.

After graphics commands or graphics data are captured (116) by either an emulator or redirected API interface or an API wrapper or a dummy/fake graphics driver, they are sent to one or multiple graphics rendering apparatuses (150) via inter-connect network (170) (e.g., system-area-network, local area network, local bus connection or hierarchy, or other similar inter-connect or network communications). An interactive application host (110) can comprise one or multiple network/communication interfaces (154) for transmitting graphics commands or graphics data, and receiving data via the inter-connect network (170).

Examples of local bus connection include but not limited to PCI, or PCI-X, or PCI-Express, or other similar bus mechanism. Examples of system-area-network include but not limited to Infiniband. Furthermore, the connection in FIG. 2 can comprise bus hierarchy involving one or multiple bus bridges, or one or multiple switches, or one or multiple chip interconnects, or combination of local bus with system-area-network.

It should be understood the scope of the present invention should not be limited to any specific interconnect configuration or interconnect topology or interconnect standards.

Figure 3:
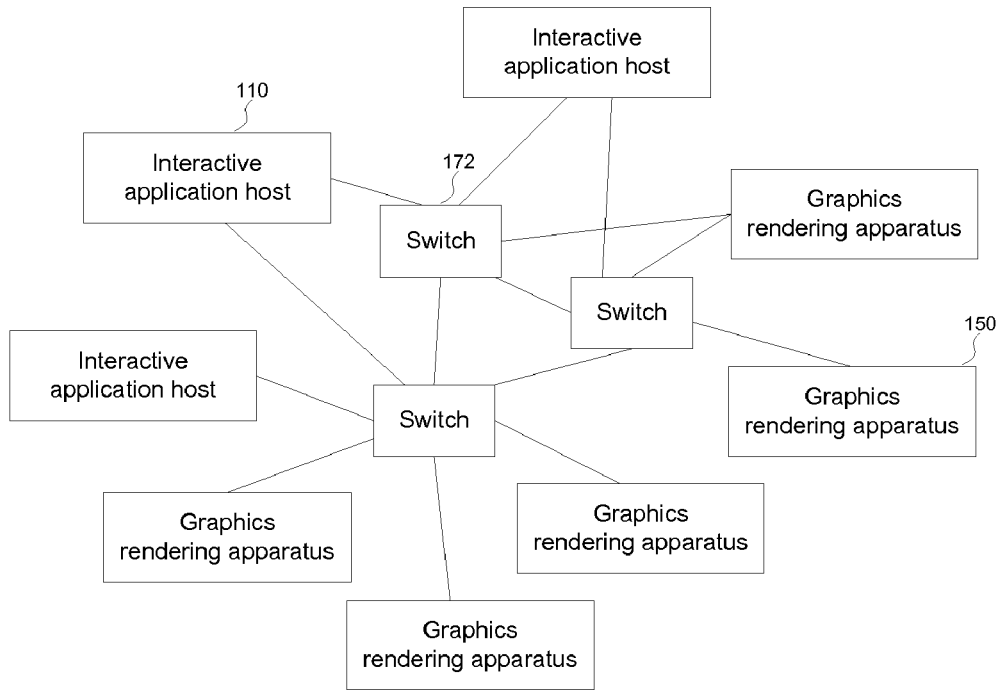
FIG. 3 is a block diagram showing, in one exemplary embodiment, a switch based inter-connect mechanism that connects interactive application hosts with graphics rendering apparatuses.

FIG. 3 is a block diagram showing, in one exemplary embodiment of the present invention, a switch (172) based inter-connect mechanism that connects multiple interactive application hosts (110) with one or multiple graphics rendering apparatuses (150). In one embodiment, a graphics rendering apparatus (150) can be shared by multiple interactive application hosts (110). An interactive application host (110) can access multiple graphics rendering apparatuses (150).

It should be understood that FIG. 3 is for illustration purpose only. An inter-connect that connects graphics rendering apparatus (150) with interactive application host (110) can include but not limited to, advanced switching fabric built over high speed bus, or Gigbit ethernet, or other local-area-network, or Infiniband, or other system-area-network interconnect, etc.

Figure 4:
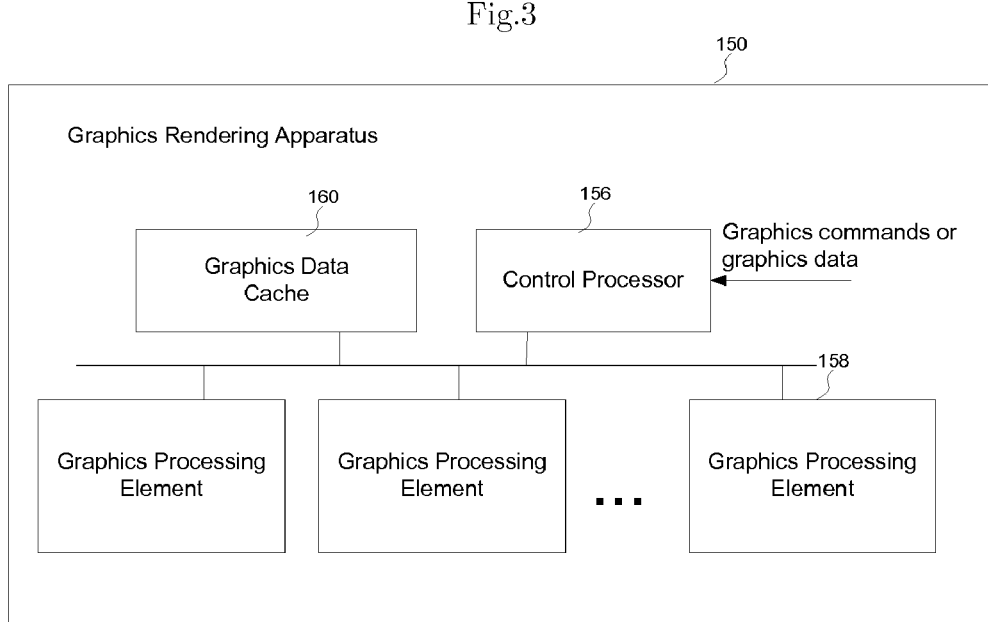
FIG. 4 is a block diagram showing, in one exemplary embodiment, components of graphics rendering apparatus.

FIG. 4 is a block diagram showing, in one embodiment of the present invention, components of graphics rendering apparatus (150). A graphics rendering apparatus (150) comprises one or multiple control processor (156), or one or multiple graphics processing elements (158), or one or multiple graphics data caches (160) (e.g., system memory, graphics or video memory, hard disk, flash memory, SRAM, etc).

A graphics rendering apparatus (150) comprises one or multiple graphics processing elements. A graphics processing element (158) can render one or multiple streams of graphics frames for one or multiple interactive application instances (e.g., interactive application task, process, or threads, etc.). A graphics processing element (158) can be a GPU (graphics processing unit) or a DSP (digital signal processor) or a computer micro processor or other similar processing element capable of running graphics processing and rendering. In additional embodiment, a graphics rendering apparatus (150) can render or generate frame images concurrently for multiple game applications.

A graphics rendering apparatus (150) can also comprise one or multiple control processor (156). A control processor (156) takes the role of setting up the graphics processing elements (158), or dispatching graphics processing commands or graphics processing workload to the graphics processing elements (158).

Furthermore, a graphics rendering apparatus (150) can comprise integrated network processing capability. It can receive graphics commands or graphics data from multiple interactive application hosts.

A graphics rendering apparatus (150) can comprise one or multiple graphics data caches (160). In one embodiment, a graphics data cache (160) is used for caching graphics data locally in a graphics rendering apparatus (150) to save bandwidth of transmitting graphics data from an interactive application host to the graphics rendering apparatus (150). For example, due to inter-frame coherence or locality, a video game host may send the same set of graphics data such as texture maps or collection of geometry data to a graphics rendering apparatus (150) during rendering of consecutive frames, instead of sending the same data over and over again, the repeated graphics data can be cached by a graphics rendering apparatus (150).

The kind of graphics data that can be cached include but not limited to, texture maps, or geometry data, or 3D mesh, or vertex attributes, or shader programs or other similar graphics data.

Still referring to FIG. 4 and graphics data caching, in one embodiment of the present invention, when graphics data is cached by a graphics rendering apparatus (150), an interactive application host can query whether a piece of or a set of graphics data has been cached by a destination graphics rendering apparatus (150).

In some additional embodiment, an identifier is assigned to each piece or each set of graphics data. In this case, an interactive application host can query whether a set of or a piece of graphics data is cached by a graphics rendering apparatus (150) using its identifier. If the answer is yes, the interactive application host can save communication bandwidth and speed up graphics processing by transmitting only the graphics commands, and references to the cached graphics data.

In accordance with the present invention, in some alternative embodiment, an interactive application host sends graphics data identifier first. If a graphics rendering apparatus (150) can not find the associated graphics data, it can respond to the interactive application host and ask for the interactive application host to send the missing graphics data.

In accordance with the present invention, in one embodiment, graphics data caching is managed at the graphics API level. For example, when using OpenGL or Direct3D, a game application needs to declare frequently the accessed graphics data as graphics API objects. In the case of Direct3D, a graphics object can be texture surfaces or vertex buffers or other similar graphics data. The same texture surface or vertex buffer can be used repeatedly for rendering frames. A dummy graphics API driver or emulation driver or implementation of redirected API interface can capture declaration of graphics objects and have the corresponding graphics data such as texture map or vertex attributes cached in a graphics rendering apparatus (150). A unique identifier can be assigned to a cached graphics object. A video game host or a graphics rendering apparatus (150) can query whether a graphics object is cached using its identifier. In accordance with the present invention, in a embodiment, how video game hosts or graphics rendering apparatuses (150) come up the identifier is irrelevant. Note that graphics object is a type of graphics data.

In one embodiment, the identifier can be computed in a centralized way using one or multiple servers who can uniquely assign an identifier to each graphics object.

In an alternative embodiment, identifier can be computed in a distributed way by interactive application host or graphics rendering apparatus (150). For example, in one embodiment, for a newly declared graphics object, an interactive application host can assign an identifier that is a concatenation of its machine name and the current time.

It should be understood that the aforementioned example is to demonstrate how easily identifiers can be assigned to graphics objects. The example is not intended to limit the scope of the present invention to any specific way how identifier is computed and assigned to graphics object.

Furthermore, the scope of the present invention is neither limited by who can compute or assign an identifier to a graphics object. Identifier can be assigned by either an interactive application itself, or an interactive application host, or a graphics rendering apparatus, or some other graphics object name/identification server.

Still referring to graphics data cache (160), depending on the implementation, a graphics data cache (160) may store many copies of redundant graphics data. For example, if many interactive application hosts run the same interactive application and use the same graphics rendering apparatus (150), the graphics rendering apparatus (150) may cache multiple copies of the same graphics data if different identifiers are assigned to the same graphics data by different interactive application hosts.

In one embodiment of the present invention, graphics object identifier can be assigned by the interactive application itself. For the same piece of graphics data, for example, the same texture map, it is always referenced using the same identifier by an interactive applications. This embodiment requires the game applications themselves to manage identities of graphics data and expose them to the interactive application hosts or the graphics rendering apparatuses (150). Alternatively, the issue can be dealt with transparently.

In one embodiment, graphics data can be compressed and then transmitted to a graphics rendering apparatus as a solution for reducing bandwidth demand. Examples of compressible graphics data include but not limited to textures, or 3D geometry attributes, or vertex attributes, or vertex buffer data, or vertex arrays, or 3D mesh, or other similar graphics data.

In additional embodiment, mobile codes or programs for generating or synthesizing graphics data can be transmitted to a graphics rendering apparatus in replacing of the graphics data themselves. For example, many interactive applications use some sorts of particle simulation to simulate natural phenomena or to achieve many visual effects. Instead of sending large amount of particle data, an interactive application can transmit or upload mobile codes or programs of particle simulation to a graphics rendering apparatus. During graphics rendering, the mobile codes or programs can generate or simulate particle data based on certain control parameters. Those control parameters can be sent by an interactive applications in realtime without consuming large amount of bandwidth.

In another example, an interactive host can send programs or codes that can synthesize or generate textures to a graphics rendering apparatus instead of transmitting the textures themselves. Similarly, 3D mesh can be also generated or synthesized using codes or programs. Those mesh generating or synthesizing or tessellation programs or codes can be transmitted to a graphics rendering apparatus for producing mesh data instead of transmitting the mesh data themselves.

Furthermore, mesh generating or synthesizing programs can export control parameters that can be used for controlling mesh generation. An interactive application host can at runtime send different configurations of control parameters to generate the kind of mesh that it wants without transmitting large number of vertices or geometry data.

In addition, vertex attributes such as texture coordinates, etc., can also be generated or synthesized using programs or codes executed by a graphics rendering apparatus.

Figure 5:
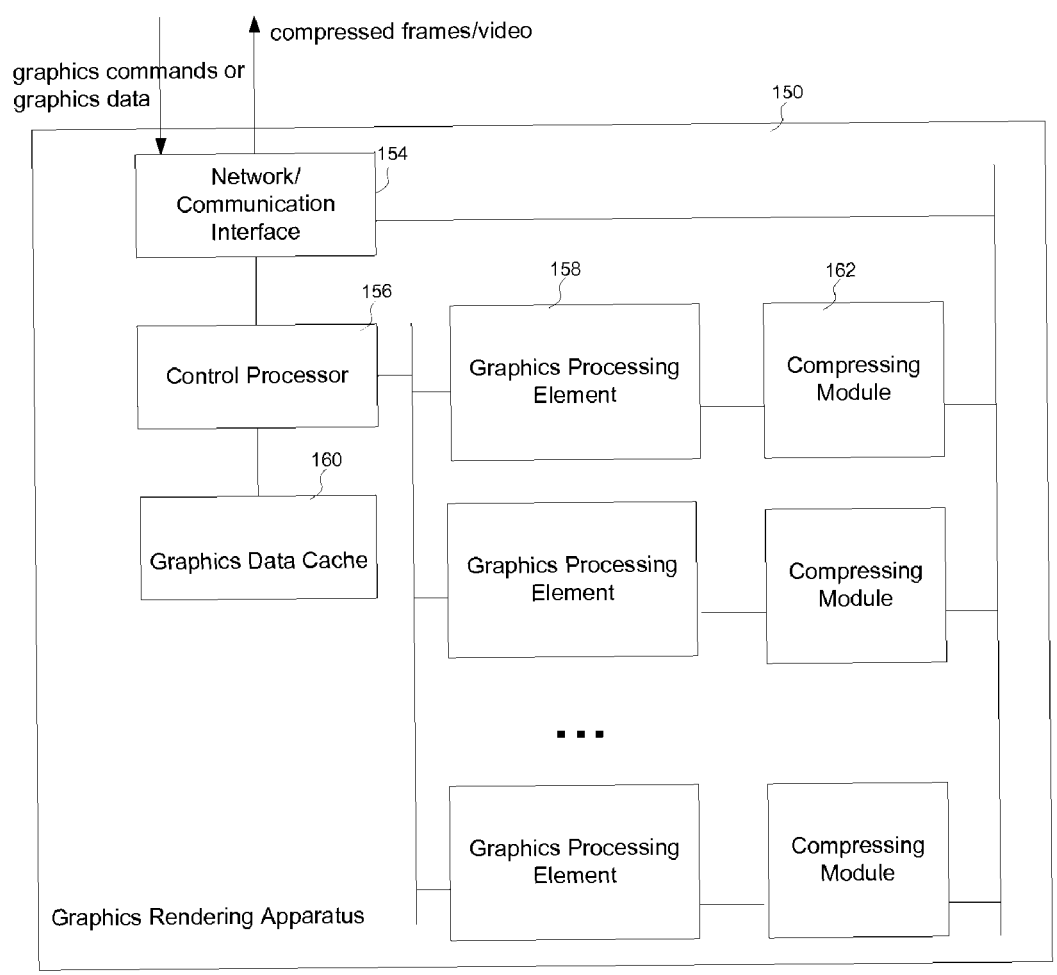
FIG. 5 is a block diagram showing, in one exemplary embodiment, components of a graphics rendering apparatus with frame compression support.

FIG. 5 is a block diagram showing, in one additional embodiment of the present invention, components of a graphics rendering apparatus (150) with frame compression support. In accordance with the present invention, during or after graphics rendering, rendered frames of an interactive application can be compressed. A graphics rendering apparatus (150) receives graphics data or commands via its network/communication interface (154). The data can be cached or stored in the graphics data cache (e.g., video memory, graphics memory, system memory, etc.) (160). A control processor (156) takes the role of setting up the graphics processing elements (158), or dispatching graphics processing commands or graphics processing workload to the graphics processing elements (158). After rendering, the frames can be compressed by a compressing module (162). In accordance with the present invention, in an embodiment, frames can be rendered on virtual or non-display frame buffers.

In additional embodiment, a graphics rendering apparatus (150) can directly deliver the compressed frames to the client via broadband network (e.g., Internet, IP-TV network, 3G/4G network, etc.).

Figure 6:
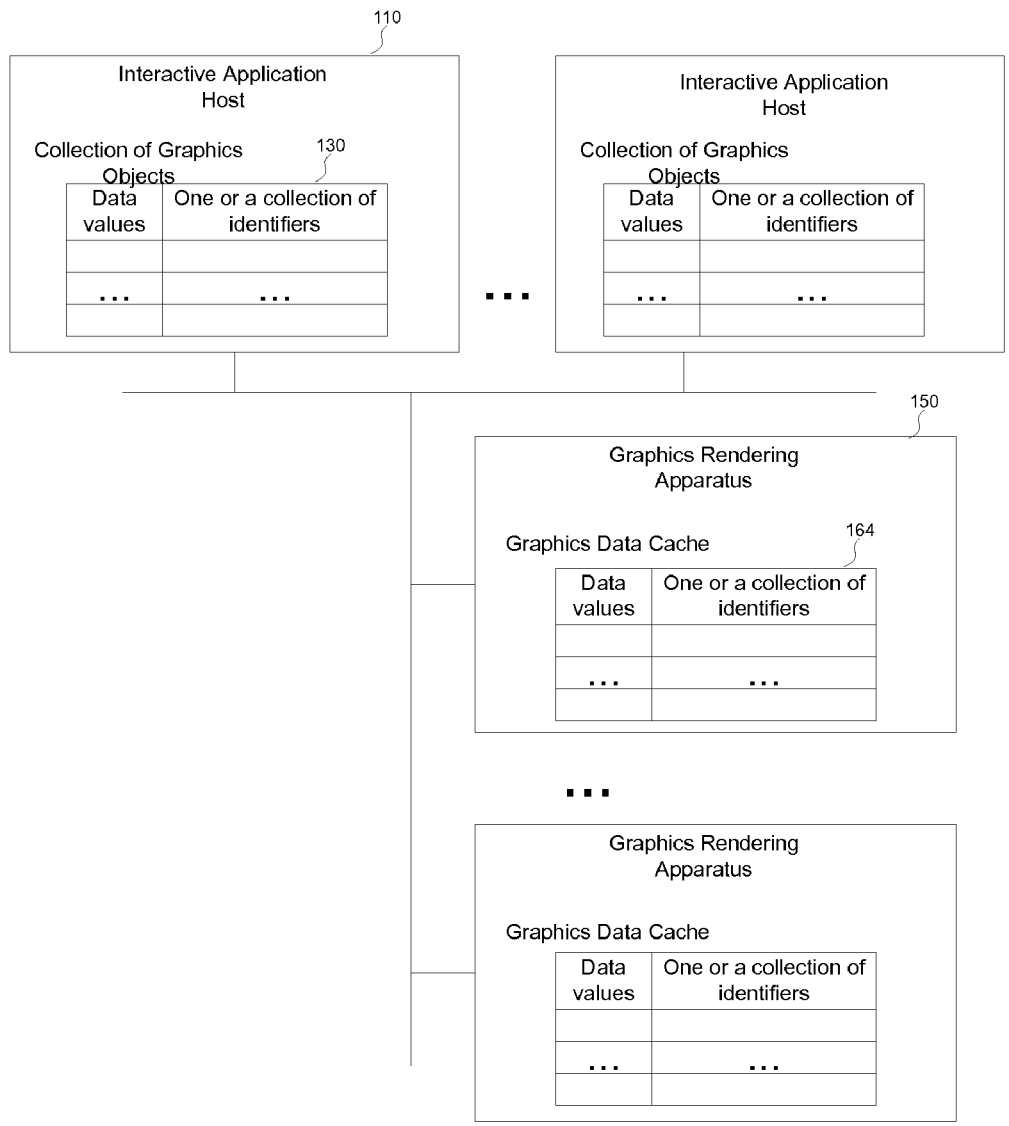
FIG. 6 is a block diagram showing, in one exemplary embodiment, components of graphics data cache.

FIG. 6 is a block diagram showing, in one embodiment of the present invention, components of graphics data cache and a collection of graphics objects (130). Under this embodiment, graphics object with identical data values are identified to avoid caching or transmitting the same data values multiple times. In one embodiment, graphics data identifier will be assigned based on it data values. Under this embodiment, graphics data that have identical data values can be assigned the same identifier.

Still referring to FIG. 5, to test whether a new graphics object is identical to some old graphics objects, in one embodiment, a digital hash (e.g., hash, signature, or other similar shortened representative value) can be computed for each graphics object using its data values. An interactive application host or a graphics rendering apparatus (150) or a stand-alone name/identification server can maintain a collection of graphics object (130) hash values and their corresponding data values.

When a new graphics object is declared, its hash value can be matched against the collection of hash values. If there is no match, this new graphics object is certainly not a replica of some existing graphics objects and a new identifier can be assigned to it. In some embodiment, if there is a match, data values of this new graphics object can be compared with the data values of those matched graphics objects. If it is found out that this new graphics object is the same as some old graphics object, this new graphics object can be referenced using the same identifier assigned to the old graphics object who has identical data values.

To give a more concrete example, for example, in one embodiment, assume that a texture image is used by multiple instances of the same interactive application by more than one interactive application host (110). Further, assume that several interactive application hosts (110) use the same graphics rendering apparatus (150). The first time, a graphics object of the texture map is created, an identifier is assigned to it. When it is first time processed by the rendering apparatus (150), its data values will be cached. Next time, when the same texture map is used by another instance of the same interactive application, another graphics object based on the same data will be created. Since this graphics object has identical data values with the old graphics object, it will be assigned the same identifier. If this another instance of the same interactive application wants to render frames using this texture map and finds out that it has been cached by the rendering apparatus, it will simply send graphics rendering commands plus identifier of the texture graphics object. It is not necessary to transmit the texture itself because an identical version of the texture is already cached by the graphics rendering apparatus (150).

Still describing caching of identical graphics data, comparison of graphics data hash values can be carried out by either the video game host or by some dedicated server or by the graphics rendering apparatus (150). In one embodiment, one or multiple centralized servers can be used for checking whether graphics objects with identical values have been created by different interactive application hosts (110).

Alternatively, an embodiment can apply distributed servers where each server serves a number of interactive application hosts (110). Each server will have its own collection of graphics objects (130) created by the interactive application hosts (110) it connects with. The distributed servers themselves can be synchronized on the graphics objects or graphics object identifiers that have been created or assigned.

Alternatively, in another embodiment, a graphics rendering apparatus (150) can compare the identifiers and/or the data values of the graphics objects that it wants to cache with those already cached and detect whether a copy of the graphics data has already been cached.

In one embodiment, when there is insufficient storage space left for caching new graphics objects in a graphics rendering apparatus (150), a graphics rendering apparatus (150) can remove some cached graphics objects.

Furthermore, a graphics rendering apparatus (150) can notify interactive application hosts via unicast or via multicast or via broadcast the status of the graphics objects removed from its collection of graphics data cache (164).

It should be understood that the exemplary embodiments aforementioned are for demonstration purpose to show how the present invention may work in the field. They are not intended to limit the scope of the present invention to the illustrated approaches of caching graphics data.

As various changes can be made in the above embodiments and operating methods without departing from the spirit or scope of the following claims, it is intended that all matter contained in the above description or shown in the accompanying drawings should be interpreted as illustrative and not in a limiting sense. The invention is not limited by the specific embodiments described herein. Variations or modifications to the design and construction of this invention, within the scope of the appended claims, may occur to those skilled in the art upon reviewing the disclosure herein. Such variations or modifications, if within the spirit of this invention, are intended to be encompassed within the scope of any claims to patent protection issuing upon this invention.

What is claimed is:

1. A method for executing interactive application by at least one interactive application host of an interactive application host center, wherein the interactive application is under the control of at least one client that along with an optional collection of clients receives via broadband network, frame stream or video of the interactive application rendered by the interactive application host center, said method comprising, sending graphics command and/or graphics data of the interactive application via inter-connect networks to at least one graphics rendering apparatus that is assigned to process the interactive application's graphics rendering wherein said graphics rendering apparatus comprising multiple graphics processing elements, at least one graphics data cache, and a means of dispatching graphics commands to graphics processing elements for concurrently rendering frames of multiple interactive applications;

querying whether the graphics data is currently cached in the graphics rendering apparatus; sending the graphics data to the graphics rendering apparatus if the graphics rendering apparatus does not have a copy of the graphics data, or allowing the graphics command to share the graphics data that is cached in the graphics rendering apparatus; and rendering frames or video of the interactive application on off-screen frame buffer by the graphics rendering apparatus according to the graphics command and/or the graphics data.

2. The method in claim 1, further comprising,
   before sending the graphics command or graphics data, capturing the graphics command and/or graphics data by an emulator, wherein the emulator emulates a target platform or operating system to support execution of the interactive application.
3. The method in claim 1, further comprising,
   intercepting graphics command and/or graphics data by a graphics driver running on the interactive application host; and
   forwarding the captured graphics command and/or graphics data to the graphics rendering apparatus via inter-connect networks.
4. The method in claim 1, wherein graphics data is sent, further comprising,
   compressing the graphics data; and
   transmitting the compressed graphics data to the graphics rendering apparatus.
5. The method in claim 1, wherein graphics data is queried, further comprising,
   allowing graphics command from different interactive application instances to share identical graphics data that is cached by the graphics rendering apparatus, wherein identifier is assigned to graphics data and graphics commands can share graphics data of the same identifier, or share graphics data of different identifier but containing identical data values.
6. The method in claim 5, wherein one or a plurality of identifiers are assigned to a graphics data, further comprising,
   computing the identifier using at least one hash value based on the graphics data, wherein the result identifier comprises the hash value.
7. The method in claim 1, wherein graphics data is queried, further comprising,
   sending at least a query to the graphics rendering apparatus on whether the graphics data is cached in the graphics rendering apparatus.
8. A method for processing graphics rendering of an interactive application by at least one graphics rendering apparatus of an interactive application host center under the request of at least one interactive application host, wherein the interactive application executed by the interactive application host is under the control of at least one client that along with an optional collection of clients receives via broadband network, frame stream or video of the interactive application rendered by the graphics rendering apparatus, said method comprising,
   caching graphics data of the interactive application in at least one graphics data cache of the graphics rendering apparatus wherein said graphics rendering apparatus comprising multiple graphics processing elements, at least one graphics data cache, and a means of dispatching graphics commands to graphics processing elements for concurrently rendering frames of multiple interactive applications; and
   allowing the cached graphics data to be shared by more than one instance of interactive application and rendering frames of the interactive application instance by the graphics processing element on off-screen frame buffer.
9. The method in claim 8, further comprising,
   responding to query of the cached graphics data from an interactive application host.
10. The method in claim 8, further comprising,
    storing graphics data identifiers of a collection of graphics data, wherein for each graphics data of the collection of graphics data, at least one copy of the graphics data is cached in the graphics rendering apparatus.
11. The method in claim 10, wherein identifier is assigned to graphics data, further comprising,
    computing the identifier using at least one hash value based on graphics data, wherein the result identifier comprises the hash value.
12. The method in claim 8, further comprising,
    for graphics data received by a graphics rendering apparatus, detecting whether a piece of graphics data with identical values is cached by the graphics rendering apparatus; and
    if such graphics data is found, using the found graphics data as replacement of the received graphics data.
13. The method in claim 8, further comprising,
    removing one or a plurality of pieces of cached graphics data when there is insufficient storage space left for caching new graphics data by a graphics rendering apparatus.
14. The method in claim 8, wherein if a piece of graphics data is removed from a graphics rendering apparatus, further comprising,
    sending at least one notification message to one or multiple interactive application hosts.
15. The method in claim 14, further comprising,
    sending the notification message via multi-cast.
16. A graphics rendering apparatus for processing graphics rendering of at least one interactive application instance of an interactive application host center, wherein the interactive application instance is executed by at least one interactive application host under the control of at least one client that along with an optional collection of clients receives via broadband network, frame stream or video of the interactive application rendered by the graphics rendering apparatus, the system comprising,
    multiple graphics processing elements;
    a means of dispatching graphics commands to said graphics processing elements for concurrently rendering frames of multiple instances of interactive applications wherein said graphics commands are sent via inter-connect networks from interactive application hosts wherein said interactive applications are executed by said interactive application hosts;
    multiple off-screen frame buffers wherein graphics processing elements of the graphics rendering apparatus render frames of said multiple instances of interactive applications on said off-screen frame buffers;
    at least one graphics data cache; and
    at least one control processing element programmed to, caching graphics data of the interactive application by the graphics rendering apparatus in at least one graphics data cache; allowing the cached graphics data to be shared by more than one instance of interactive application, and/or responding to query of the cached graphics data.
17. The graphics rendering apparatus in claim 16, further comprising,
    at least one compression processing element coupled with the graphics processing element that can compress the rendered frame(s) of an interactive application.
18. The graphics rendering apparatus in claim 16, further comprising,
    at least one network or communication interface, wherein said interface receiving graphics data and/or graphic command from at least one interactive application host via inter-connect network.
19. The inter-connect network in claim 18 is PCI Express switch.
20. The inter-connect network in claim 18 is Ethernet.

* * * * *